J. YOUNG.
Cultivator.

No. 204,412. Patented May 28, 1878.

WITNESSES
Nat. E. Oliphant
John L. Coudrow

INVENTOR
Joseph Young,
per Chas. H. Fowler,
Attorney

UNITED STATES PATENT OFFICE.

JOSEPH YOUNG, OF CLAYTON, MICHIGAN.

IMPROVEMENT IN CULTIVATORS.

Specification forming part of Letters Patent No. 204,412, dated May 28, 1878; application filed January 17, 1878.

*To all whom it may concern:*

Be it known that I, JOSEPH YOUNG, of Clayton, in the county of Lenawee and State of Michigan, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1:
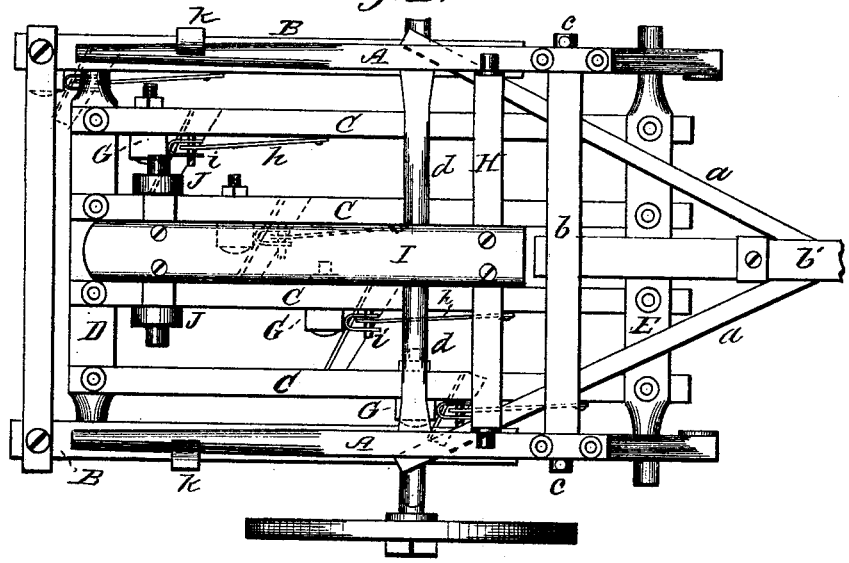
Figure 2:
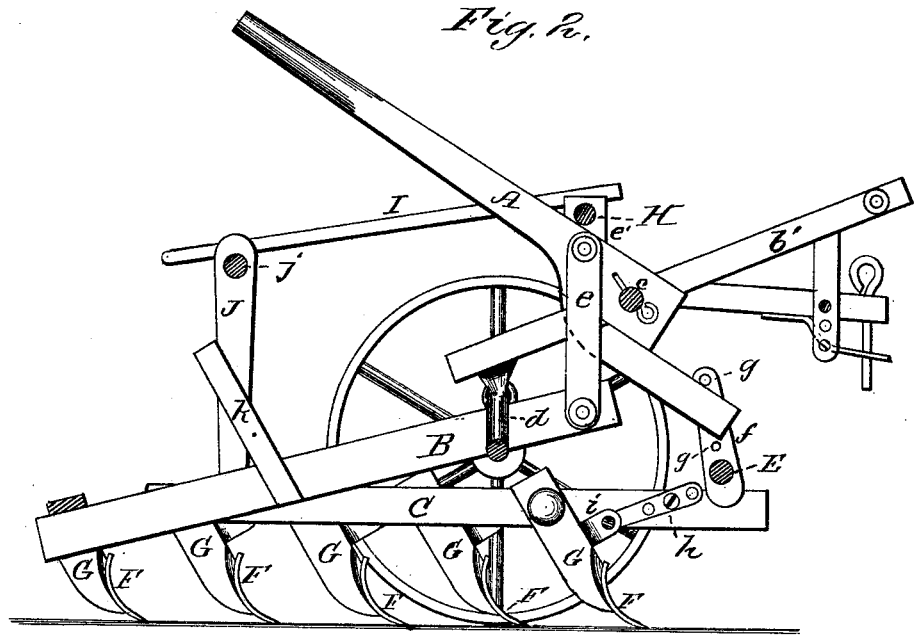

Figure 1 of the drawing is a representation of a top-plan view of my invention, and Fig. 2 is a side elevation, partly in section.

This invention has relation to wheel-cultivators; and the object and purpose thereof is to construct such an agricultural implement that the frame to which the plows are attached will have a backwardly oblique rising and correspondingly oblique forward falling motion, and also suspending the seat or seat-board, that the weight of the operator or any other weight thereon will apply any required power to the plows by transferring said weight from the carriage to the plows, or from the plows to the carriage, and thereby control and gage the depth of the plows. The arrangement and combination of the several parts whereby these results are effected will be hereinafter described, and subsequently pointed out in the claims.

In the accompanying drawings, $a$ represents the hounds, to which is secured a longitudinal bar, $b$, running at right angles with the tongue or pole $b'$ of the carriage. The ends of the bar $b$ have rounded journals $c$, which pass into correspondingly-formed bearings in levers A, and act as fulcrums for said levers when used in lifting and adjusting the teeth or plows to or from the ground.

Underneath the axle-tree $d$, and on each side thereof, will be seen beams B, fastened by hinges or other equivalent means to the axle-tree $d$, so as to project a short distance forward of the same. To the forward ends of the beams B are connected links or straps $e$, which couple the beams to the levers A above the axle-tree. Between the beams B is a frame or series of parallel bars, C, bolted or otherwise secured to cross-piece D, the same having its bearings in the beams, while the forward cross-piece E has its bearings in adjustable pendent straps $f$. The journals of the cross-piece D are somewhat larger than the journals of the cross-piece E, which is the one that serves as a support for the frame of parallel bars C, and is also the one by which it is propelled forward and held in a lateral position, for reasons that, by the cross-piece E being suspended by the straps $f$ to the front end of the levers, the forward end of the frame of bars C is likewise suspended, and by the double action of the levers the frame is held in a horizontal position; and, further, the pendent straps $f$, heretofore mentioned as suspending the forward end of this frame of bars, have a series of holes, $g$, by which the length of the straps may be varied, in order that the frame of bars C may have a perfect horizontal adjustment to the ground, thereby giving the plows an equal depth. To this frame of parallel bars are attached the plows or teeth F by first being bolted or otherwise secured to plow-standards G, the latter being bolted so as to freely turn upon their bolts. The standards are held in position by braces $h$, one end of which is pivoted to the side of the bars C and pivoted to ears $i$ upon the standard, which arrangement allows the standards to turn back upon meeting any obstruction which would tend to injure the plow. The plows in their arrangement are placed in successive order upon the frame of bars C, so that each plow fills the furrow of the one next preceding it.

It will be seen that a wheel-cultivator constructed as above described, or according to my invention, is rendered extremely flexible in accommodating itself to the surface, and so sensitive as to increase the resistance of the soil, immediately taking a less depth in stiffer soils, as it would, to an extent, be inoperative with simply its own weight, except in the lightest and loosest soils.

To provide against this want of power, and to give efficient force and the required depth to the plows in stiff soils without making any attachment of the frame to the wheels, which would destroy its flexibility, I have provided the following means to accomplish the results desired:

The inner side straps $e'$, which couple the levers A to the forward ends of the beams B, extend above the levers sufficiently to form bearings for a cross-bar, H, which reaches across the cultivator forward of the axle-tree d. At right angles with the cross-bar H, and at its center, is attached one end of a seat-board, I, which extends to the back end of the cultivator, and the other end of said seat-board is secured to a cross-piece, j, having its bearings in the upper end of standards J, the lower ends of which are pivoted to the outer sides of the bars C.

It will readily be seen that when the operator takes position upon the seat with one foot upon each side thereof, and he sits directly over the axle-tree, his weight will rest directly over the same, and should he sit as far back as possible the entire weight will be upon the plows, so that any required power is applied to the plow at the will of the operator without altering the flexibility of the implement in any perceptible degree.

The levers A are made fast when the plows are not required for use, and are caught into catches or latches k. Other suitable means may, however, be used or employed to effect the same purposes; but I prefer the catches, as above described, as being the simplest and most practical means to hold the levers down when the frame of parallel bars is raised.

It will be noticed that the point at which the forward ends of the beams B are hinged to the axle-tree is much above the point of attachment to the frame of parallel beams or bars C, and also that the point of attachment to the axle-tree is, as it were, a center of motion, and when the frame of bars C rises it recedes backward; or, in other words, the frame and side beams are so connected to each other and the beams to the axle that through the medium of the levers A the frame C is caused to have an oblique backward rising and a correspondingly oblique forward falling motion from the ground, which gives a perfect relief over uneven surfaces of the ground as to the depth of the plows.

As will be seen, the increase of depth of the plows increases the pressure of the frame of bars C backward, and consequently increases the lifting effect of the side beams B, as the whole draft or propelling power is communicated through them. This effect is deemed very essential, as it is desirable to have the plows or teeth reach all low or hollow places of the ground-surface, and also that there be a ready and easy relief over the knolls, ridges, and higher points on the surface of the ground. This relieving force is so far operative that the teeth in loose and mellow soils will not take an over-depth, while the cultivator is left to run free and with only its own weight. Now, this light touch upon the ground—or otherwise the light, shallow, as well as uniform, cut of the plow—is of great value in the cultivation of lands, as most weeds are best destroyed by being cut as near the surface, or as slightly below it, as possible; and this uniform depth cannot be accomplished with the wheels made rigid to the cultivator-frame; and so having the teeth set to any given depth, on account of the irregular plane over which the wheels have to pass, is one of the objects sought.

Having now fully described the construction and operation of my invention, what I claim as new, and desire to secure by Letters Patent, is—

1. A cultivator-frame to which the plows are attached, said frame being pivoted at its rear end to side beams, or to a frame pivoted or hinged to the axle, and at its front end to pivoted levers, whereby the frame may have an oblique forward falling motion and a correspondingly oblique backward rising motion, substantially as and for the purpose set forth.

2. The combination, with the cultivator-frame C and side beams B, constructed to operate as specified, of the seat or seat-board, connected to said frame and beams by pivoted standards J and straps $e'$, substantially as and for the purpose set forth.

3. The frame consisting of the parallel bars C, connected at its rear end to the pivoted cross-piece D and at its front end to cross-piece E, the latter having its bearings in pendent straps f, in combination with the levers A, straps e, and beams B, substantially as and for the purpose described.

In testimony that I claim the above I have hereunto subscribed my name in the presence of two witnesses.

JOSEPH YOUNG.

Witnesses:
 E. W. CURTIS,
 ISAAC BENEDICT.